INVENTOR.
GARRETT J. KELLY
BY
ATTORNEY

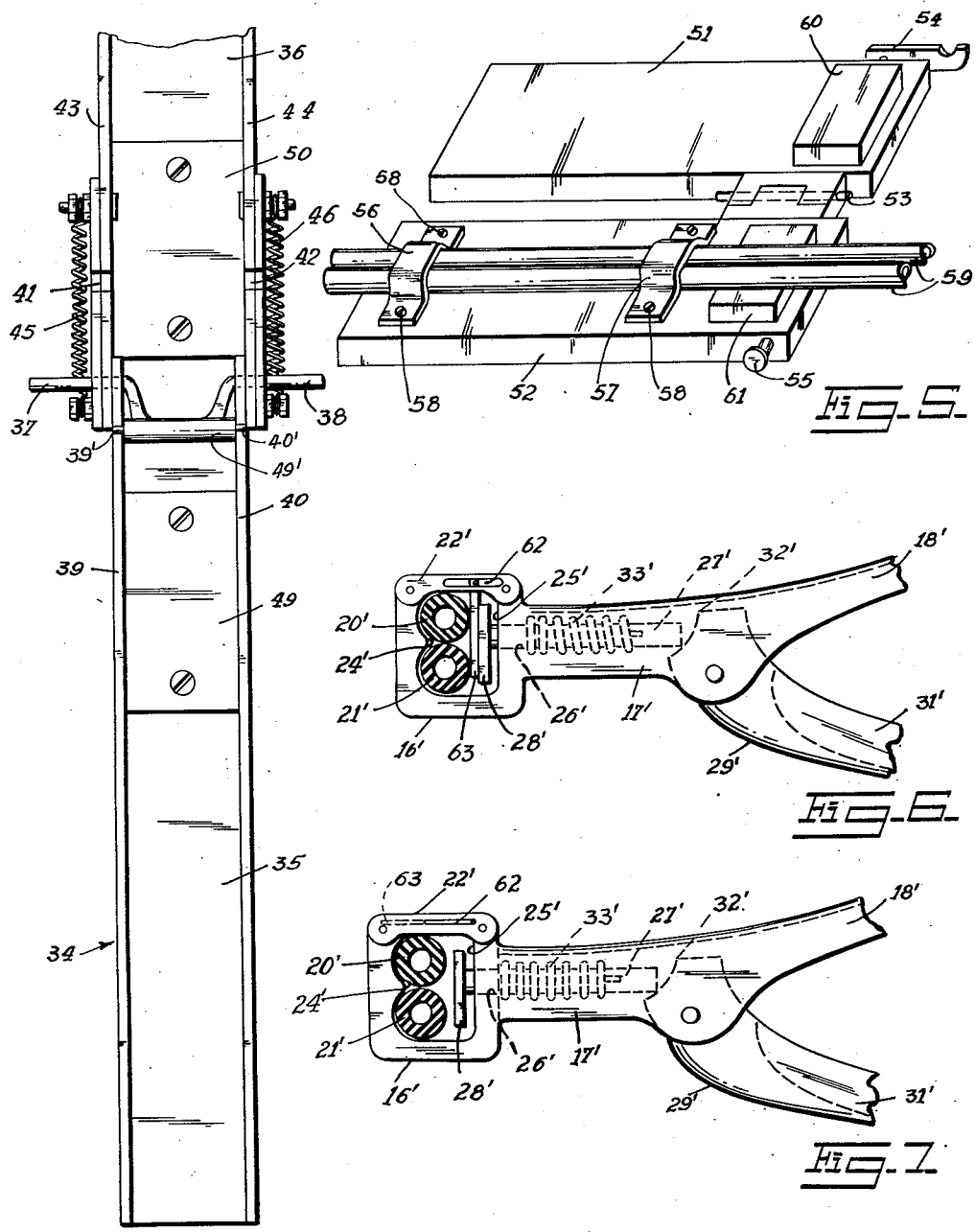

United States Patent Office 2,796,228
Patented June 18, 1957

2,796,228

SAFETY CLAMP SHUT-OFF DEVICE FOR HOSES OF ACETYLENE TORCHES

Garrett J. Kelly, Astoria, N. Y.

Application November 6, 1953, Serial No. 390,614

2 Claims. (Cl. 251—7)

This invention relates to new and useful improvements in devices for shutting off the flow in deformable wall conduits such as hoses for acetylene, oxygen, air and other fluids.

More particularly, the present invention proposes the construction of an improved safety clamp fluid shut-off device which can be used to shut off, quickly and easily, the fluid flow in the rubber hoses of acetylene burning and welding equipment, pneumatic equipment and the like.

Another object of the present invention proposes forming the safety clamp shut-off device so that it can be operated either by hand or by foot for emergency use.

Still further, the present invention proposes constructing the new clamp with adjustable means so that it can be used with different size conduits.

As a further object, the present invention proposes arranging the clamp so that it can conveniently be placed across the rubber hoses of gas burning and welding equipment several feet away from the burner or welder and the flow of gases quickly shut off either by stepping on the clamp or squeezing it to stop any serious damage and possible burns should the torch backfire or catch fire due to leaks in the torch or poor fitting connections.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a top view of the clamp structure shown in Fig. 3, the clamp being shown in open position with part of the upper section broken away.

Fig. 5 is a perspective view illustrating another modification of the present invention.

Fig. 6 is a fragmentary view similar to Fig. 1 but illustrating a still further modification of the present invention.

Fig. 7 is a view similar to Fig. 6 but showing the hinged adjustment member in raised position.

Figure 1:
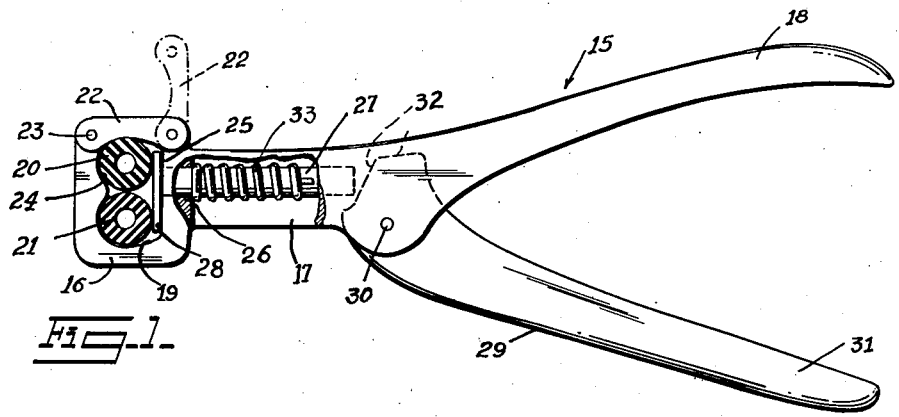
Fig. 1 is a side view of a clamp constructed and arranged in accordance with the present invention with conduits therein, parts of the clamp being broken away and in section and a part being shown in dot-dash outline in its open position, the parts being shown in inoperative position.
Figure 2:
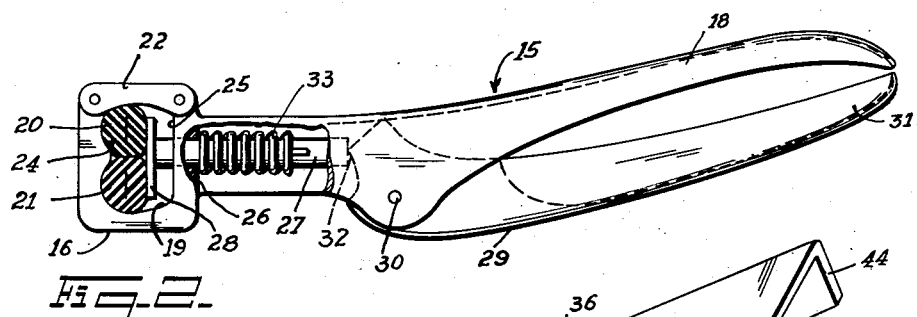
Fig. 2 is a view similar to Fig. 1 but showing the clamp in its operative position.

The safety clamp shut-off device, in accordance with the first form of the invention illustrated in Figs. 1 and 2, is a clamp 15 having a U-shaped head 16 with a hollow shank 17 and handle 18 fixed to and preferably formed integral with the head 16.

Head 16 because of its U-shape has a passage 19 through it removably to receive deformable wall conduits such as rubber hoses 20 and 21 shown.

A head closing member or strap 22 is pivotally mounted on the head 16 and extendible across the open end of the U-shaped head 16 to close the open end after conduits 20 and 21 are in the passage 19. A removable pin 23 holds the member 22 in its closed position and makes it an effective conduit retaining means in conjunction with the head 16.

One inner wall 24 of head 16 forms a conduit backing portion on the clamp 15 and opposite this backing portion wall 24 is a wall 25 through which extends an opening 26. A plunger 27 is movably mounted in shank 17 and is slidable through the opening 26. A plate 28 is fixed to one end of the plunger 27 and is disposed inside the U-shaped head 16 within passage 19 to provide a conduit deforming member on the clamp 15.

A lever 29 is pivotally mounted on shank 17 by pivot pin 30. Lever 29 has a handle portion 31 at one end and a cam portion 32 at the other end adjacent the plunger 27. The cam 32 bears against the rear end of the plunger 27 when the handle portion 31 is squeezed against handle 18 forcing the plunger forward so that the plate 28 compresses and deforms the conduits 20 and 21 until they are closed.

A coil spring 33 is mounted in the shank 17 around the plunger 27. One end of the coil spring 33 bears against the plunger 27 and the other end abuts the head 16 to provide means to bias the plunger 17 in its retracted position shown in Fig. 1.

Figure 3:
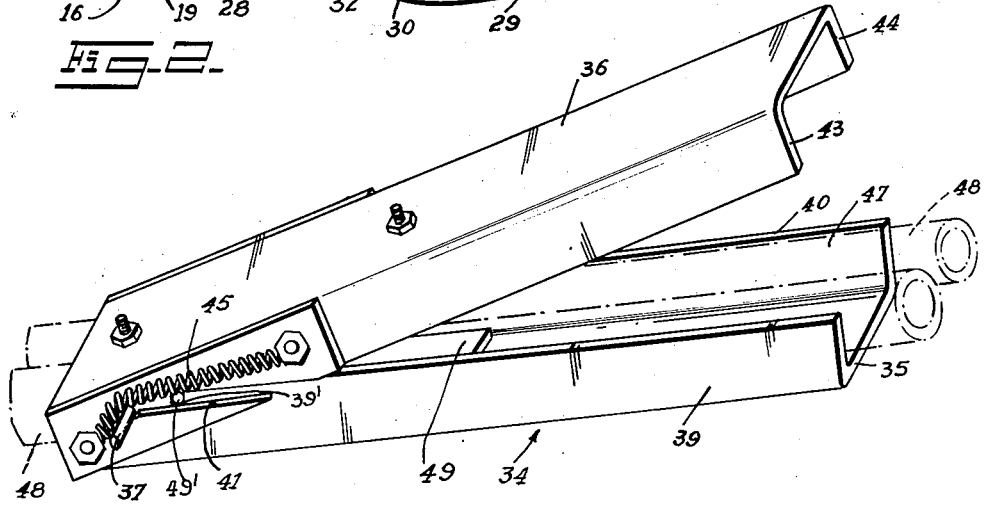
Fig. 3 is a perspective view of another clamp with conduits indicated in dot-dash outline illustrating a modification of the present invention.

The modification of the invention illustrated in Figs. 3 and 4 is characterized by the provision of a clamp 34 having two mating channel-shaped members 35 and 36 with connected trunnions 37 and 38 extending from the sides 39 and 40 of member 35 at one end of member 35.

Member 36 has slotted recesses 41 and 42 in its sides 43 and 44 at one end of the member 36 to removably and pivotally receive the trunnions 37 and 38. Coil springs 45 and 46 are fixed at each end to member 36 on sides 43 and 44 adjacent recesses 41 and 42 to bear against the trunnions 37 and 38, respectively. These springs 45 and 46 bias the channel-shaped members 35 and 36 together with a passage 47 running through them and formed by the two mating channel members 35 and 36.

Deformable wall conduits 48, indicated in dot-dash outline, extend through the passage 47. Plates 49 and 50 fixed to the members 35 and 36 respectively form conduit backing portions and conduit deforming members on the clamp. A round conduit deflating bar 49′ extends from side 39 to side 40 across the member 35, the ends of the bar 49′ being turned down and removably mounted and vertically slidable in slots 39′ and 40′ in sides 39 and 40 respectively. The bar 49′ is thus mounted adjacent plate 50 for coaction therewith. The trunnions provide a fulcrum for the two members 35 and 36 to function as levers.

The modification of the present invention illustrated in Fig. 5 is characterized by the provision of two mating halves or plates 51 and 52 hinged together at one side by a hinge pin 53 with a locking latch 54 and pin 55 at the other side on halves 51 and 52, respectively. Straps 56 and 57 held to half 52 by screws 58 provide conduit retaining means on the clamp to hold rubber tubes or conduits 59 thereto. Raised plates 60 and 61 fixed to the halves or plates 51 and 52, respectively, form a conduit deforming member and a conduit backing portion on the clamp.

The modification of the invention illustrated in Figs. 6 and 7 is similar to that shown in Figs. 1 and 2 and is given similar reference numerals but the numerals are primed to distinguish them. The modification of Figs. 6 and 7 differs from the structure shown in Figs. 1 and 2 in that the head closing member or strap 22' has a slotted opening 62 positioned for disposal above the open end of the U-shaped head 16'. An adjustable plate 63 has one end pivotally and slidably mounted in the slotted opening 62 for disposal of the plate 63 either across the open end of the U-shaped head as shown in Fig. 7 or extending down into the U-shaped head 16' as shown in Fig. 6 and slidable in the head. This adjusting plate 63 permits different size conduits 20' and 21' to be used in the head 16'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A safety clamp shut-off device for deformable wall conduits such as hoses for acetylene and other fluids comprising a clamp having a U-shaped head with a hollow shank and a handle fixed thereto, said head having a passage therethrough for receiving deformable wall conduits, said passage being defined in part by a conduit retaining means and a conduit backing portion, a conduit deforming member mounted on the clamp for movement toward and away from the backing portion, said conduit deforming member being a plate with a plunger fixed thereto, lever means to move the conduit deforming member toward the backing member to clamp and deform a conduit therebetween, said lever means being a lever pivotally mounted on said shank with a handle portion at one end and a cam portion at the other end adapted to engage the plunger for reciprocating the same, said conduit retaining means being a head closing member pivotally mounted on the head and extendible across the open end thereof to close said end after a conduit is in said passage, said head closing member having a slotted opening positioned for disposal above the open end of the U-shaped head, and an adjustment plate having one end pivotally and slidably mounted in the slotted opening of the head closing member for disposal either across the open end of the U-shaped head or extending into the U-shaped head, in which latter position said adjustment plate is disposed between the plunger plate and a conduit in the clamp passage in the path of movement of the plunger plate whereby movement of said plunger plate slides said adjustment plate in the passage.

2. A safety clamp shut-off device for deformable wall conduits such as hoses for acetylene and other fluids comprising a clamp having a U-shaped head with a hollow shank and a handle fixed thereto, said head having a passage therethrough for receiving deformable wall conduits, said passage being defined in part by a conduit retaining means and a conduit backing portion, a conduit deforming member mounted on the clamp for movement toward and away from the backing portion, said conduit deforming member being a plate with a plunger fixed thereto, lever means to move the conduit deforming member toward the backing member to clamp and deform a conduit therebetween, means to bias the conduit deforming member away from the conduit backing member and to hold it normally in such biased position, the wall of said head opposite the backing portion wall having an opening, said plunger being movably mounted in said shank and slidable through said opening, said lever means being a lever pivotally mounted on said shank with a handle portion at one end and a cam portion at the other end adjacent the plunger adapted to engage the plunger for reciprocating the same, said means to bias the conduit deforming member being a spring having one end connected with the plunger and the other end connected to the shank, said conduit retaining means comprising a head closing member having a slotted opening positioned for disposal above the open end of the U-shaped head, and an adjustment plate having one end pivotally and slidably mounted in the slotted opening of the head closing member for disposal either across the open end of the U-shaped head or extending into the U-shaped head, in which latter position said adjustment plate is disposed between the plunger plate and a conduit in the clamp passage in the path of movement of the plunger plate whereby movement of said plunger plate slides said adjustment plate in the passage.

References Cited in the file of this patent
UNITED STATES PATENTS

| | | |
|---|---|---|
| 742,656 | Horsey | Oct. 27, 1903 |
| 788,603 | Rowell | May 2, 1905 |
| 950,111 | Miner | Feb. 22, 1910 |
| 2,082,669 | Voigt | June 1, 1937 |
| 2,167,952 | Jordan | Aug. 1, 1939 |
| 2,197,995 | Crowley | Apr. 23, 1940 |
| 2,619,386 | Dalrymple | Nov. 25, 1952 |